United States Patent

Swenson et al.

[11] Patent Number: 5,901,808
[45] Date of Patent: May 11, 1999

[54] METHOD AND KIT FOR MOUNTING AN OIL COOLER TO A MOTORCYCLE

[75] Inventors: Dale R. Swenson, Wales; William A. Scheiding, Oak Creek; Scott Stonecipher, Kewaskum, all of Wis.

[73] Assignee: Harley-Davidson Motor Company, Milwaukee, Wis.

[21] Appl. No.: 08/950,552

[22] Filed: Oct. 15, 1997

[51] Int. Cl.$^6$ .................................................. F01P 11/08
[52] U.S. Cl. ........................................... 180/229; 180/68.4
[58] Field of Search .................................... 180/219, 229, 180/68.4, 68.6; 248/647, 674; 123/196 AB

[56] References Cited

U.S. PATENT DOCUMENTS

| | | | |
|---|---|---|---|
| 4,662,470 | 5/1987 | Fujisawa et al. | 180/68.4 |
| 4,995,448 | 2/1991 | Inagaki et al. | 180/229 |
| 5,244,036 | 9/1993 | Michl | 180/68.4 |
| 5,715,778 | 2/1998 | Hasumi et al. | 180/229 |

OTHER PUBLICATIONS

Harley–Davidson Motor Company Instructions, 62571–77B, 62577–77B. Rev. Dec. 1994.
1994 Custom Chrome Catalog, p. 675.
1996 Harley–Davidson Genuine Motor Accessories and Genuine Motor Parts, p. 170.

*Primary Examiner*—Kevin Hurley
*Attorney, Agent, or Firm*—Michael Best & Friedrich LLP

[57] ABSTRACT

A method and apparatus for mounting an oil cooler to a motorcycle having a regulator. The method includes the steps of detaching the regulator from the first location on the motorcycle, mounting the oil cooler to the motorcycle substantially at the first location, and relocating the regulator to a second location on the motorcycle. The invention may be provided in an oil cooler adapter kit including an oil cooler and a mounting bracket having a frame mount portion, an oil cooler mount portion, and a regulator mount portion. The kit may further include spacers that extend from the frame to the regulator mount portion of the mounting bracket.

15 Claims, 5 Drawing Sheets

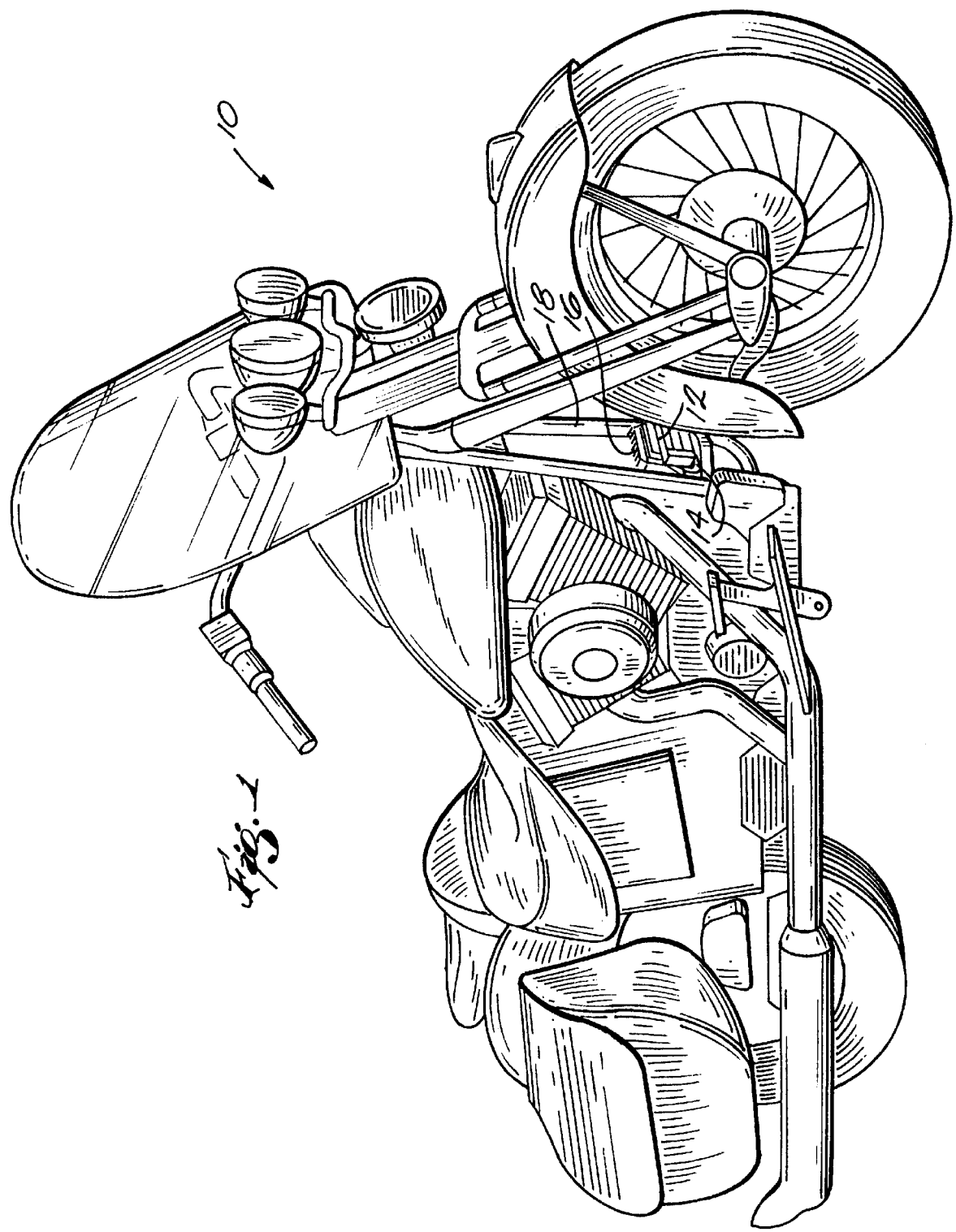

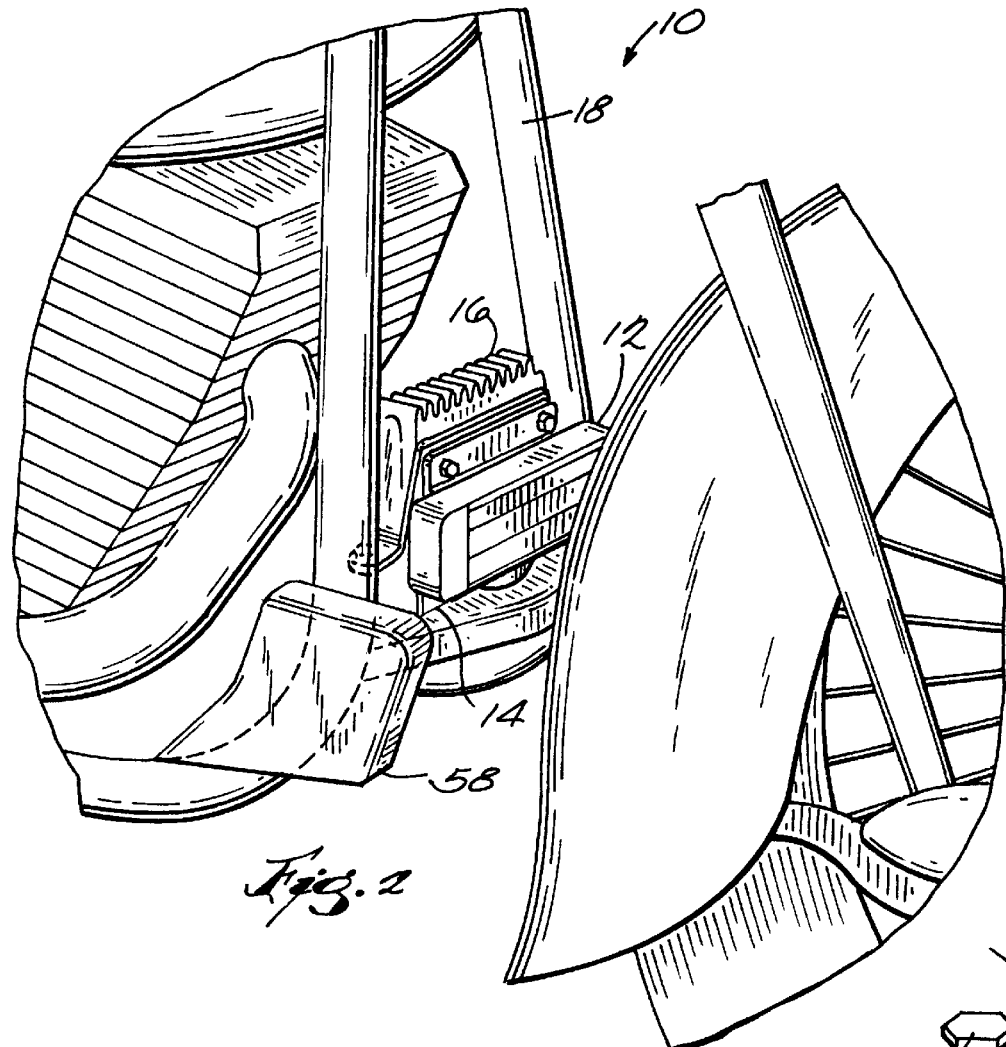
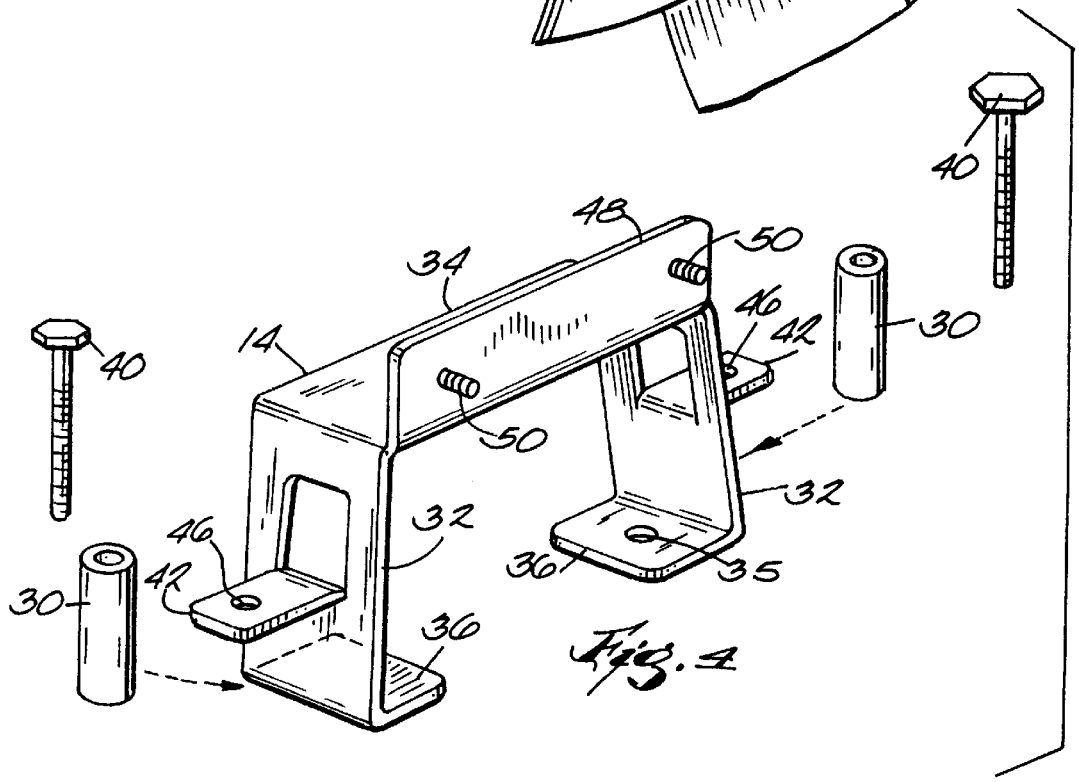

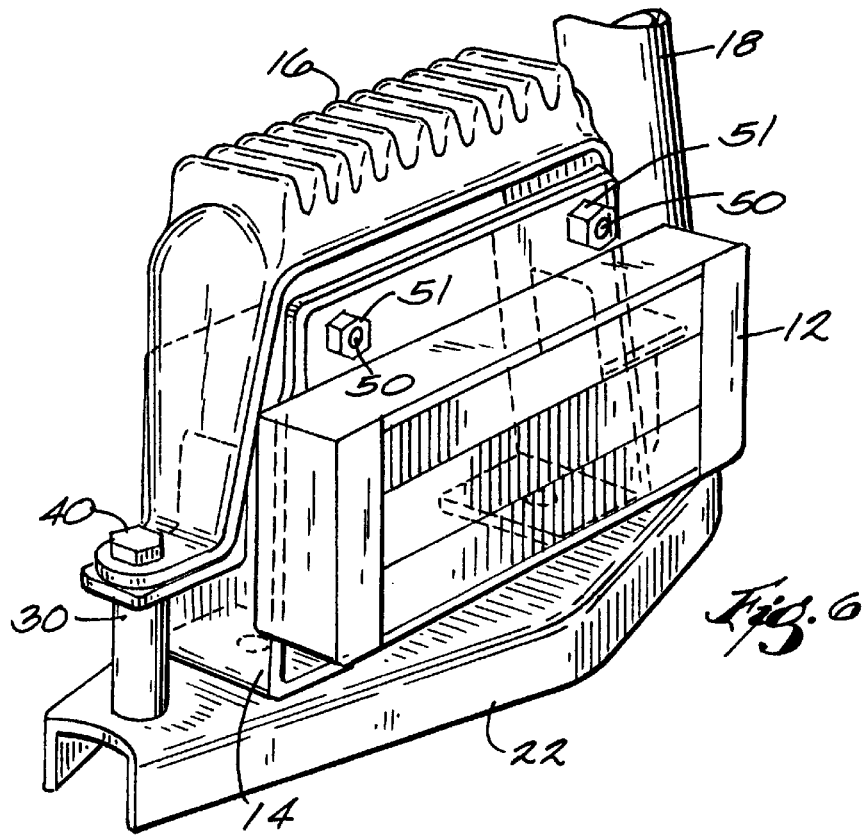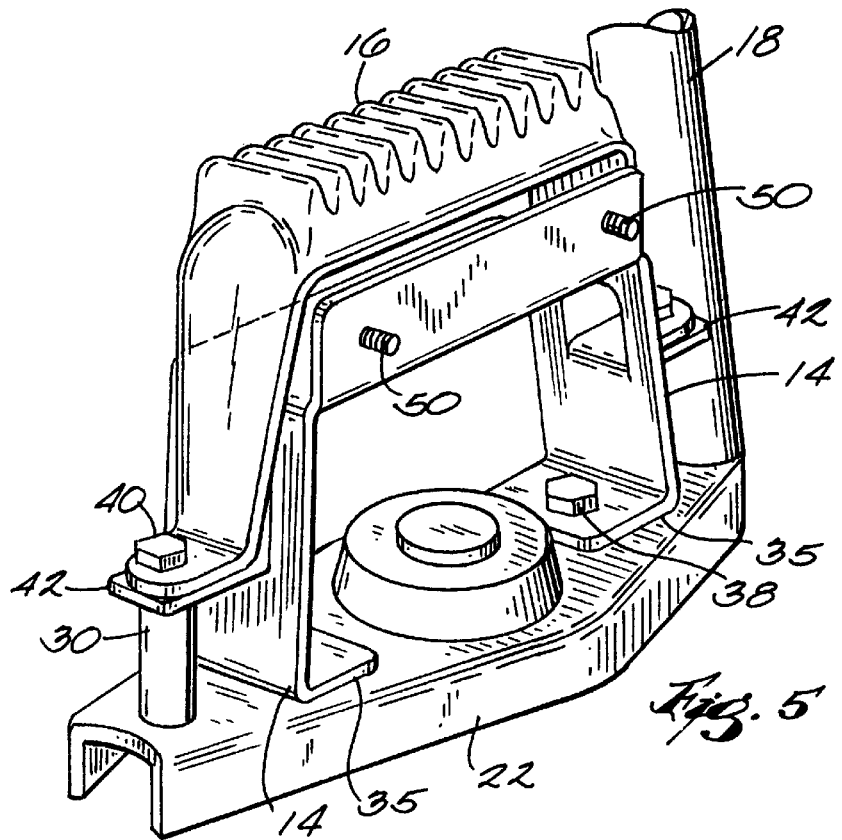

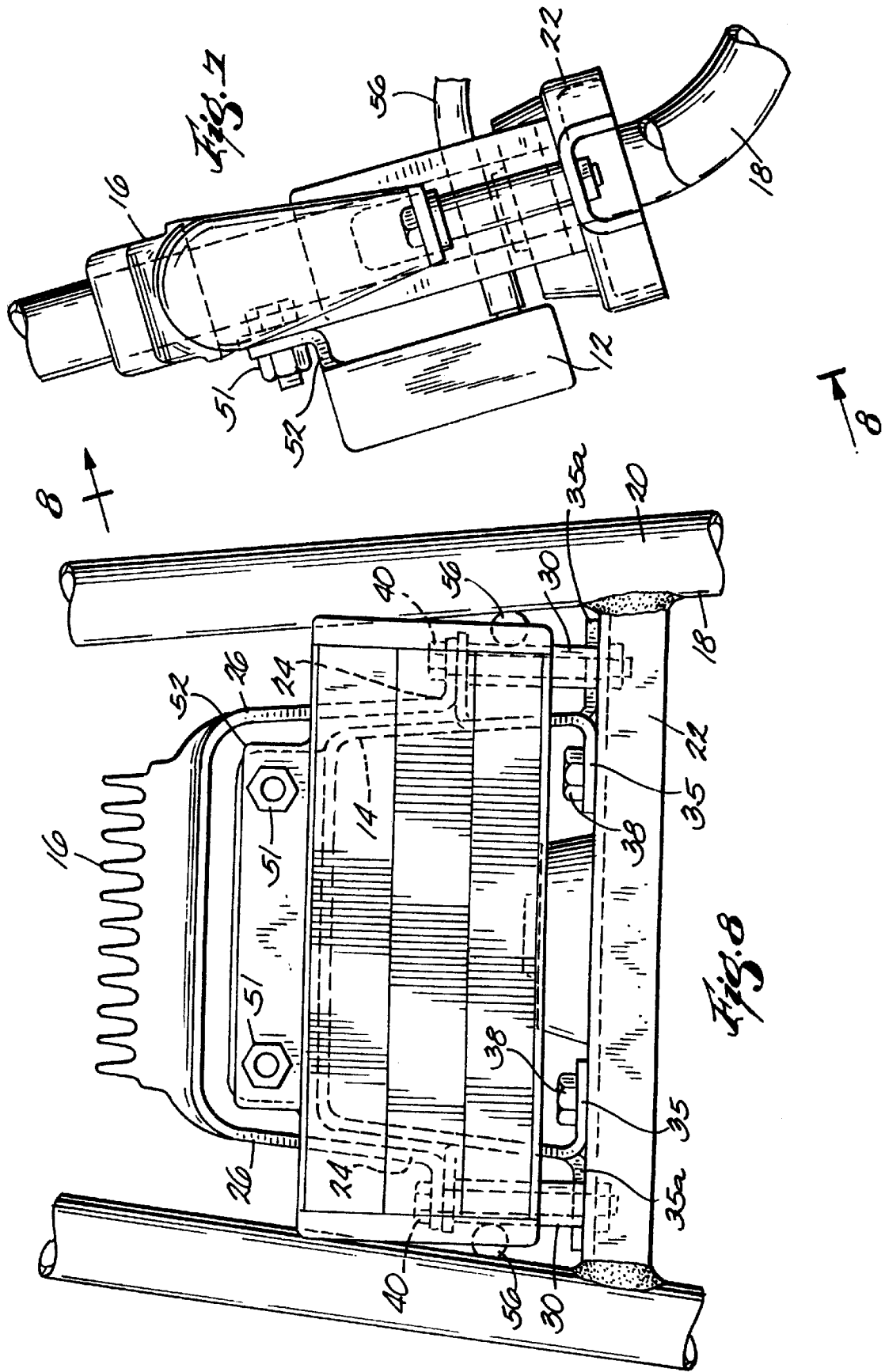

METHOD AND KIT FOR MOUNTING AN OIL COOLER TO A MOTORCYCLE

FIELD OF THE INVENTION

The present invention generally relates to the field of oil coolers for motorcycles, and specifically to oil cooler mounting brackets.

BACKGROUND OF THE INVENTION

Oil coolers can be beneficial additions to motorcycles in order to help keep the engine oil operating within an optimal temperature range. Oil coolers may be especially useful if the motorcycle engine is air cooled, as opposed to liquid cooled, or if the motorcycle operates in an excessively warm climate.

However, the space on a motorcycle in which to mount an oil cooler is limited. Thus, fitting an oil cooler on a motorcycle that is not originally designed with an oil cooler may be challenging. For example, in the front of the motorcycle there is a relatively small amount of space between the frame and the front wheel or fender. This location is useful for the mounting of an oil cooler because of the high air pressure at the front of the motorcycle as the motorcycle is moving. However, the space is limited, especially when the fork is compressed, and the space may be occupied by other components, such as a regulator. Further, the mounting arrangements of any such components to the motorcycle may be limited by the appropriate mounting points, such as usable points on the frame.

SUMMARY OF THE INVENTION

The present invention provides a useful and convenient method for mounting an oil cooler to a motorcycle that may already have a regulator mounted at the desired location. The present invention provides an arrangement that is both rigid and robust, and clean and compact. Additionally, the invention provides a kit for accomplishing the invention that is relatively simple, inexpensive, and has few parts. The arrangement of the present invention places the oil cooler in a location that is effective and permits airflow through the oil cooler, and also enhances clearance with the fender and front wheel. Finally, the present invention permits retention of the stock regulator, and mounts the regulator in a convenient location.

More specifically, the invention provides a method of mounting an oil cooler to a motorcycle having a regulator. The method comprises the steps of detaching the regulator from a first location on the motorcycle, mounting the oil cooler to the motorcycle substantially at the first location, and positioning the regulator at a second location on the motorcycle. The mounting step may include the steps of providing a mounting bracket, and securing the oil cooler to the mounting bracket. The positioning step may include the step of mounting the regulator to the motorcycle above the oil cooler.

The invention also provides an oil cooler adaptor kit for mounting the oil cooler on a motorcycle frame. The kit comprises a mounting bracket and an oil cooler adapted to be secured to the mounting bracket. The mounting bracket includes a frame mount portion adapted to be secured to the motorcycle frame, an oil cooler mount portion spaced from the frame mount portion and adapted to be secured to the oil cooler, and a regulator mount portion spaced from the frame mount portion and adapted to be secured to the regulator. The kit may include a spacer that is designed to be positioned between the frame and the regulator mount portion.

The invention further provides a motorcycle comprising a frame, a mounting bracket, an oil cooler secured to the oil cooler mount portion of the mounting bracket, and a regulator secured to the regulator mount portion of the mounting bracket. The mounting bracket includes a frame mount portion, an oil cooler mount portion and a regulator mount portion. The frame mount portion is secured to the frame, the oil cooler mount portion is spaced from the frame mount portion and secured to an oil cooler, and the regulator mount portion is spaced from the frame mount portion and secured to the regulator.

The mounting bracket may be configured to include vertical sidewalls and a horizontal top wall connecting the vertical sidewalls, and the regulator mount portion may comprise a tab that extends from the vertical sidewalls. Further, the mounting bracket may be formed from steel plate, and the tab may be stamped out of the vertical sidewalls of the mounting bracket.

BRIEF DESCRIPTION OF THE DRAWINGS

FIG. 1 is a perspective view of a motorcycle having an oil cooler and a voltage regulator mounted according to the present invention.

FIG. 2 is close-up of the perspective view of FIG. 1.

FIG. 4 is an exploded perspective view of the mounting bracket, spacers, and fasteners of the assembly of the present invention.

FIG. 5 is a perspective view of the mounting bracket and regulator mounted to the motorcycle frame.

FIG. 6 is a perspective view of the oil cooler, mounting bracket and regulator mounted to the motorcycle frame.

FIG. 7 is a side view of the oil cooler and regulator mounted to the motorcycle.

FIG. 8 is a front view of the oil cooler and regulator mounted to the frame of the motorcycle.

Figure 3:
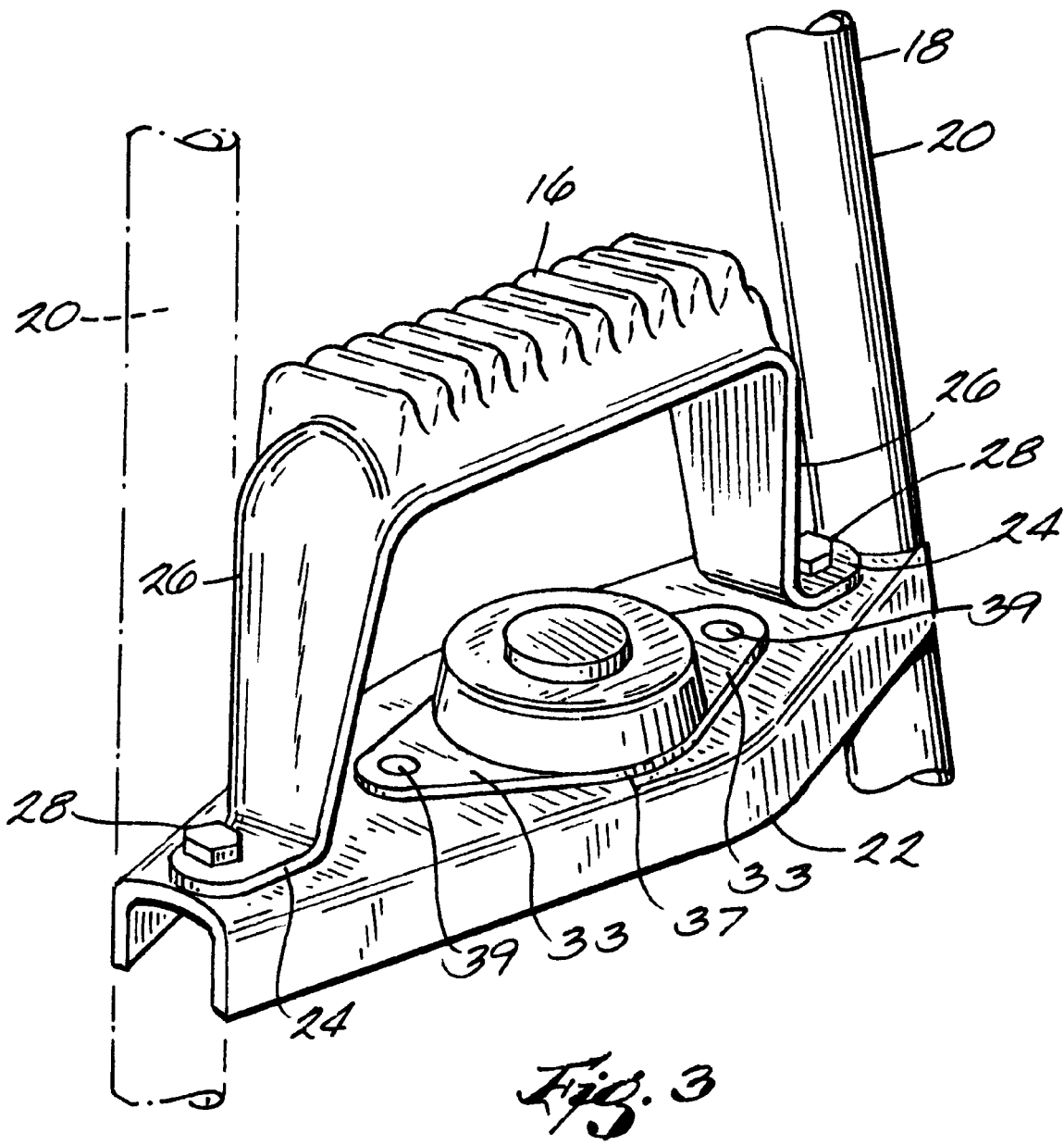
FIG. 3 is a perspective view of the regulator mounted to the frame before the mounting bracket has been installed.

Before one embodiment of the invention is explained in detail, it is to be understood that the invention is not limited in its application to the details of the construction and the arrangements of processes set forth in the following description or illustrated in the drawings. The invention is capable of other embodiments and of being practiced or being carried out in various ways. Also, it is understood that the phraseology and terminology used herein is for the purpose of describing the illustrated embodiment and should not be regarded as limiting the scope of the invention.

DETAILED DESCRIPTION

The invention provides a method and kit for mounting an oil cooler to a motorcycle. A particularly useful feature of the invention is that an oil cooler can be mounted to a motorcycle already having a regulator mounted in the preferred oil cooler mounting location. The regulator may be retained, and the final overall configuration is clean, compact, and efficient.

A motorcycle 10 having an oil cooler 12 mounted according to the present invention is shown in FIG. 1. The motorcycle includes the oil cooler 12, a mounting bracket 14, and a regulator 16, all of which are interconnected to the frame 18 of the motorcycle 10. FIG. 2 shows a closeup of a portion of the view of FIG. 1, more closely showing the area around the oil cooler 12.

The illustrated motorcycle is commonly shipped from the manufacturer without an oil cooler. As shown in FIG. 3, the motorcycle will then include only the regulator 16 mounted between the front downtubes 20 of the frame 18. More precisely, the regulator 16 is fastened to a cross member 22 that spans the front downtubes 20. The space that the regulator 16 initially occupies comprises a first location of the regulator 16.

As clearly seen in FIG. 3, the regulator 16 has essentially an upside-down U shape including downwardly extending leg portions 26 having lower ends 24 mounted to the cross member 22 The respective lower ends 24 of the leg portions 26 are bent outward. The lower ends 24 are secured by studs through holes in the lower ends 24 to the cross member 22 and corresponding nuts 28.

The point of attachment of the regulator 16 to the cross member 22 of the frame 18 comprises the first connection point of the regulator 16 to the frame 18. Of course, the regulator 16 may initially be fixed to the frame 18 in many different ways and in many different locations.

A second connection point to the frame 18 may be provided by an engine mount 37. The engine mount 37 is used to mount the engine of the motorcycle to the frame 18. The engine mount 37 includes two flanges 33 having respective holes. The engine mount 37 is fixed to the cross member 22 with fasteners 39 that pass through the flanges 33 and into cross member 22.

In order to add an oil cooler to the motorcycle of FIG. 3, the regulator 16 is removed from the first location, and the mounting bracket 14 is positioned in the first location. Referring to FIG. 4, the mounting bracket 14 may be constructed from a sheet of metal, preferably steel, and painted or coated to prevent corrosion. The bracket 14 includes a pair of substantially vertical sidewalls 32, and a substantially horizontal top wall 34 that joins the sidewalls 32 at the top.

The mounting bracket 14 is provided with a frame mount portion for mounting the bracket 14 to the frame 18. In the illustrated embodiment, the frame mount portion comprises a lower flange 36 extending from the lower end of each sidewall 32. Each lower flange 36 includes a hole 35 to facilitate securement to the frame 18.

The mounting bracket 14 is also provided with a regulator mount portion for mounting the bracket 14 to the regulator 16. In the illustrated embodiment, the regulator mount portion comprises a tab 42 extending horizontally outward from roughly the middle of each sidewall 32. The tab 42 may be punched out of each respective sidewall 32 at about a 90° angle from the sidewall. Each tab 42 includes a hole 46 to facilitate securement to the frame 18.

Also shown in FIG. 3 are a pair of fasteners 40 and a pair of spacers 30. The spacers 30 are positioned under the tabs 42 when the mounting bracket 14 is installed, and the fasteners 40 pass through the holes 46 in the tabs 42, through the spacers 30, and into the cross member 22. In this manner, the tabs 42 can be secured to the frame 18.

The mounting bracket 14 is further provided with an oil cooler mount portion for mounting the oil cooler 12 to the mounting bracket 14. In the illustrated embodiment, the oil cooler mount portion comprises a flange 48 extending upward from the top front edge of the top wall 34 of the mounting bracket 14. The flange 48 includes a pair of threaded studs 50 that may be inserted through holes in the oil cooler 12 and fastened using nuts to mount the oil cooler 12 to the mounting bracket 14.

In the initial stage of mounting the oil cooler 12 to the motorcycle 10, depicted in FIG. 3, the regulator 16 is detached from the first location on the frame 18 by removing the nuts 28 and punching out the studs from the cross member 22. The engine mount fasteners 39 are then removed, and the mounting bracket is positioned at the first location with the holes 35 aligned with the flange holes, as shown in FIG. 5. The mounting bracket 14 is then fastened to the frame 18 over the engine mount flanges 33 using the fasteners 39. Finally, the regulator 16 is positioned at a second location above the mounting bracket 14 such that the lower ends 24 of the regulator 16 are resting on the tabs 42 of the mounting bracket 14. In the illustrated embodiment, the holes 46 in the tabs 42 (FIG. 4) line up with holes in the lower ends 24 of the regulator. The pair of fasteners 40 are then inserted through the ends 24 of the regulator 16, through the mounting bracket 14, through the pair of spacers 30, and into the frame 18 of the motorcycle 10. Thus, the fasteners 40 serve to both attach the regulator 16 and to additionally secure the mounting bracket 14. To complete the installations as shown in FIG. 6, the oil cooler 12 is then mounted to the mounting bracket 14. The oil cooler 12 is fixed to the mounting bracket 14 by passing the studs 50 through holes in the oil cooler and tightening a pair of nuts 51 over the studs 50.

The oil cooler 12 is essentially conventional, except that it is adapted to be mounted in the specific configuration shown. As best shown in FIGS. 7 and 8, the oil cooler 12 includes a flange 52 that extends from the rear of the oil cooler 12. The flange 52 extends rearward and upwards and includes a pair of holes through which studs 50 pass. A pair of hoses 56 are attached to the rear of the oil cooler 12 to carry the oil into and out of the oil cooler 12. The hoses 56 may be mounted to the oil cooler 12 in the space between the spacers 30 and the frame 18 behind the oil cooler 12. Routing the hoses 56 rearward is preferred, because the hoses 56 are then more protected from debris thrown from the front wheel of the motorcycle 10, and from damage due to bottoming out of the motorcycle.

As shown in FIG. 8, the regulator 16, in its mounted positions is positioned substantially above the oil cooler 12. The airflow to the oil cooler 12 is thus substantially unimpeded and the regulator 16 may be effectively cooled.

As best shown in FIG. 7, the oil cooler 12 extends in front of the mounting bracket 14 and the frame 18 of the motorcycle 10. This is at least in part because, as shown in FIG. 8, the oil cooler 12 is slightly wider than the opening in the frame 18 at the oil cooler location. The oil cooler is still protected from the sides by guards 58 on the sides of the frame 18 (FIG. 2). The oil cooler 12 is at about the same vertical position as the regulator 16 originally occupied in its first location. The oil cooler 12 is mounted essentially parallel to both the front down tubes 20 and cross member 22 of the frame 18. The area behind the oil cooler 12 is occupied by the mounting bracket 14, which is essentially open. This allows air to pass through the oil cooler 12 more effectively.

The invention may thus be provided in an oil cooler mounting kit that includes a mounting bracket 14 as shown in FIG. 6 and an oil cooler 12, and may additionally include fasteners 40 that mount the regulator 16 and the mounting bracket 14 to the frame 18, and spacers 30 that extend from the frame 18 to the regulator mount portion of the mounting bracket 14.

In this way the invention provides a clean appearance to the motorcycle. The bracketry and regulator 16 are at least partially obscured by the frame members or plates on the side of the frame 18. Additionally, the invention provides for effective cooling, as more air flow is available on the forward side of the motorcycle, and especially at a lower position in which there may be a relatively low pressure area behind the oil cooler 12 caused by air flowing underneath the engine. The invention also provides for greater fender clearance by compactly packing the necessary components lower and more tightly to the motorcycle. Still further, the invention provides a relatively rigid and robust structure, not only by providing a closed and robust bracket member that mounts to the frame 18 in two places, but also by providing inherent reinforcement by means of the regulator mount.

While the several embodiments of the present invention has been shown and described, alternative embodiments will be apparent to those skilled in the art and are within the intended scope of the present invention. Therefore, the invention is to be limited only by the following claims.

What is claimed is:

1. A method of mounting an oil cooler to a motorcycle having a regulator, said method comprising the steps of:

detaching the regulator from a first location on the motorcycle;

mounting the oil cooler to the motorcycle substantially at the first location; and positioning the regulator at a second location on the motorcycle.

2. The method of claim 1, wherein said mounting step comprises the steps of:

providing a mounting bracket;

mounting the mounting bracket substantially at the first location; and securing the oil cooler to the mounting bracket.

3. The method of claim 2, wherein said mounting bracket includes a regulator mount portions and wherein said positioning step comprises the step of:

mounting the regulator to the regulator mount portion.

4. The method of claim 3, wherein said step of mounting the regulator comprises positioning a spacer between the regulator mount portion and the frame.

5. The method of claim 4, wherein said step of mounting the regulator comprises inserting a fastener through the regulators the mounting brackets and the spacer and into the frame.

6. The method of claim 2, wherein the regulator is connected to the motorcycle at a first connection point when the regulator is mounted at the first location, and wherein said providing step includes providing an mounting bracket that is capable of being secured to the motorcycle at the first connection point.

7. The method of claim 1, wherein said positioning step comprises the step of:

positioning the regulator above the oil cooler.

8. The method of claim 1, wherein the motorcycle includes a motorcycle frame having an engine mount, and wherein said mounting step includes mounting the oil cooler to the engine mount.

9. A motorcycle comprising:

a frame;

a mounting bracket including:

a frame mount portion secured to the frame, an oil cooler mount portion spaced from said frame mount portion, and a regulator mount portion spaced from said frame mount portion ;

an oil cooler secured to said oil cooler mount portion; and a regulator secured to said regulator mount portion.

10. The motorcycle of claim 9, wherein said mounting bracket includes vertical sidewalls and a horizontal top wall connecting the vertical sidewalls.

11. The motorcycle of claim 10, wherein said regulator mount portion comprises a tab that extends from each of said vertical sidewalls.

12. The motorcycle of claim 11, wherein said sidewalls are formed from steel plate, and wherein said tabs are stamped out of said vertical sidewalls.

13. The motorcycle of claim 9, further comprising a spacer positioned between said frame and said regulator mount portion.

14. The motorcycle of claim 13, further comprising a fastener that attaches said regulator mount portion to said frame.

15. The motorcycle of claim 14, wherein said fastener passes through said spacer.

* * * * *

UNITED STATES PATENT AND TRADEMARK OFFICE
CERTIFICATE OF CORRECTION

PATENT NO : 5,901,808
DATED : May 11, 1999
INVENTOR(S): Dale R. Swenson, William A. Scheiding, Scott W. Stonecipher It is certified that error appears in the above-identified patent and that said Letters Patent is hereby corrected as shown below:

Column 4, Line 27, delete "upwards" and insert --upward,--.

Column 4, line 38, delete "positions" and insert --position,--.

Claim 3, Column 5, line 32, delete "portions" and insert --portion,--.

Claim 5, Column 5, line 40, delete "regulators" and insert --regulator,-- and delete "brackets" and insert --bracket,--.

Signed and Sealed this

Twenty-seventh Day of June, 2000

*Attest:*

Q. TODD DICKINSON

*Attesting Officer*       *Director of Patents and Trademarks*